United States Patent
Wang et al.

(10) Patent No.: US 8,194,401 B2
(45) Date of Patent: Jun. 5, 2012

(54) KEYBOARD MODULE

(75) Inventors: Tzu-Hung Wang, Taipei (TW);
Hsi-Ming Cheng, Taipei (TW);
Kang-Yeh Yu, Taipei (TW)

(73) Assignee: Compal Electronics, Inc., Taipei (TW)

( * ) Notice: Subject to any disclaimer, the term of this patent is extended or adjusted under 35 U.S.C. 154(b) by 533 days.

(21) Appl. No.: 12/497,536

(22) Filed: Jul. 2, 2009

(65) Prior Publication Data

US 2010/0117967 A1    May 13, 2010

(30) Foreign Application Priority Data

Nov. 12, 2008   (TW) ................................ 97143751 A

(51) Int. Cl.
*G06F 1/16* (2006.01)
*G06F 3/02* (2006.01)
*H03K 17/94* (2006.01)

(52) U.S. Cl. .............. 361/679.09; 361/679.08; 345/168; 345/169; 341/22

(58) Field of Classification Search .......... 361/679.08–679.17, 679.01–679.07, 361/679.18–679.45, 679.55–679.59; 345/168, 345/169; 341/22, 34, 150, 27; 400/492, 400/66, 489, 491, 472, 76, 485
See application file for complete search history.

(56) References Cited

U.S. PATENT DOCUMENTS

| | | | |
|---|---|---|---|
| 6,614,905 B1 * | 9/2003 | Kristensen | 379/368 |
| 6,806,815 B1 * | 10/2004 | Kaikuranta et al. | 341/22 |
| 7,733,636 B2 * | 6/2010 | Kobayashi et al. | 361/679.08 |
| 8,046,032 B2 * | 10/2011 | Babella | 455/575.1 |
| 2003/0011971 A1 * | 1/2003 | Suzuki et al. | 361/680 |
| 2007/0236462 A1 * | 10/2007 | Morris et al. | 345/169 |
| 2009/0174994 A1 * | 7/2009 | Merz | 361/679.09 |

FOREIGN PATENT DOCUMENTS

| | | |
|---|---|---|
| TW | M275471 | 9/2005 |
| TW | M292095 | 6/2006 |
| TW | 200721221 | 6/2007 |

OTHER PUBLICATIONS

"Office Action of Taiwan Counterpart Application", issued on Dec. 27, 2011, p1-p7, in which the listed references were cited.

* cited by examiner

*Primary Examiner* — Jayprakash N Gandhi
*Assistant Examiner* — Nidhi Desai
(74) *Attorney, Agent, or Firm* — Jianq Chyun IP Office

(57) ABSTRACT

A keyboard module, including a base plate, a membrane circuit, keys and a frame set, is provided. The membrane circuit is disposed on the base plate and has touch portions. The keys are assembled to the base plate and correspond to the touch portions respectively. The frame set is assembled to the base plate and includes a first frame and a second frame. The first frame has a plurality of first ribs disposed in a staggered way. The second frame is connected to the first frame and located between the first frame and the base plate. The second frame has a plurality of second ribs disposed in a staggered way, wherein a width of a portion of the second ribs is smaller than a width of the corresponding first ribs, and the keys pass through the second frame and the first frame in sequence to protrude above the frame set.

10 Claims, 6 Drawing Sheets

KEYBOARD MODULE

CROSS-REFERENCE TO RELATED APPLICATION

This application claims the priority benefit of Taiwan application serial no. 97143751, filed on Nov. 12, 2008. The entirety of the above-mentioned patent application is hereby incorporated by reference herein and made a part of specification.

BACKGROUND OF THE INVENTION

1. Field of the Invention

The present invention relates to a keyboard module and particularly to a keyboard module having a frame set.

2. Description of Related Art

In the era of information, people's reliance on electronic appliances is increasing day by day. For the demands of high efficiency and convenience, portable electronic appliances, such as notebook computer, have become indispensable to the modern people's life and work. A notebook computer includes a user interface, such as a keyboard module, which allows the user to input instructions for the internal system of the notebook computer to obey and execute.

Generally speaking, the keyboard module requires appropriate gap between the keys thereof, so as to prevent the keys from interfering each other during keystroke. In recent years, manufacturers in this field have developed a type of notebook computer which has a case covering the gaps between the keys. Compared with the traditional notebook computer, the case of this type of notebook computer needs to be designed in accordance with the shape and size of the keys of the keyboard module. Consequently, when the design of the keyboard module is changed, the case of the notebook computer needs to be redesigned and remolded, which consumes production time and costs. Moreover, because the keyboard protrudes outside the case, when the keyboard is disassembled for maintenance and cleaning, other elements which block the keyboard inside the notebook computer need to be removed first. Such a procedure is very inconvenient.

SUMMARY OF THE INVENTION

The present invention provides a keyboard module for reducing the production costs of a notebook computer.

The present invention provides a keyboard module applicable to a notebook computer. The keyboard module includes a base plate, a membrane circuit, a plurality of keys, and a frame set. The membrane circuit is disposed above the base plate, wherein the membrane circuit comprises a plurality of touch portions. The keys are assembled to the base plate and positioned above the membrane circuit to respectively correspond to the touch portions. The frame set is assembled to the base plate and covers the membrane circuit. The frame set comprises a first frame and a second frame. The first frame includes a plurality of first ribs disposed in a staggered way. The second frame is connected to the first frame and located between the first frame and the base plate. The second frame includes a plurality of second ribs disposed in a staggered way, wherein a width of a portion of the second ribs is smaller than a width of the corresponding first ribs, and each of the keys passes through the second frame and the first frame in sequence to protrude above the frame set.

According to an embodiment of the present invention, a gap is positioned between each of the keys and the first frame.

According to an embodiment of the present invention, the frame set is connected to the base plate by a plurality of positioning holes and a plurality of positioning poles.

According to an embodiment of the present invention, the frame set is connected to the base plate through a first adhesive layer.

According to an embodiment of the present invention, the second frame further comprises a first trench, and a portion of the first adhesive layer is disposed in the first trench.

According to an embodiment of the present invention, the first frame is connected to the second frame through a second adhesive layer.

According to an embodiment of the present invention, the second frame further comprises a second trench, and a portion of the second adhesive layer is disposed in the second trench.

According to an embodiment of the present invention, a material of the first frame or the second frame is plastic, metal, or glass.

According to an embodiment of the present invention, a material of the first frame is transparent.

According to an embodiment of the present invention, each of the keys includes a key cap and a connection element. The connection element is connected between the base plate and the key cap.

Based on the above, the keyboard module of the present invention has the frame set that is separated from the case of the notebook computer and can be molded individually. When the design of the frame set is changed, it is not required to fabricate new molds for the case of the notebook computer. Hence, production costs are saved. The material of the frame set does not need to be the same as the case of the notebook computer, and thus various kinds of materials may be adopted to form the frame set. In addition, the gaps between the second frame and keys of the frame set are enlarged, which reduces the occurrence of noise caused by keystroke.

To make the above features and advantages of the present invention more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
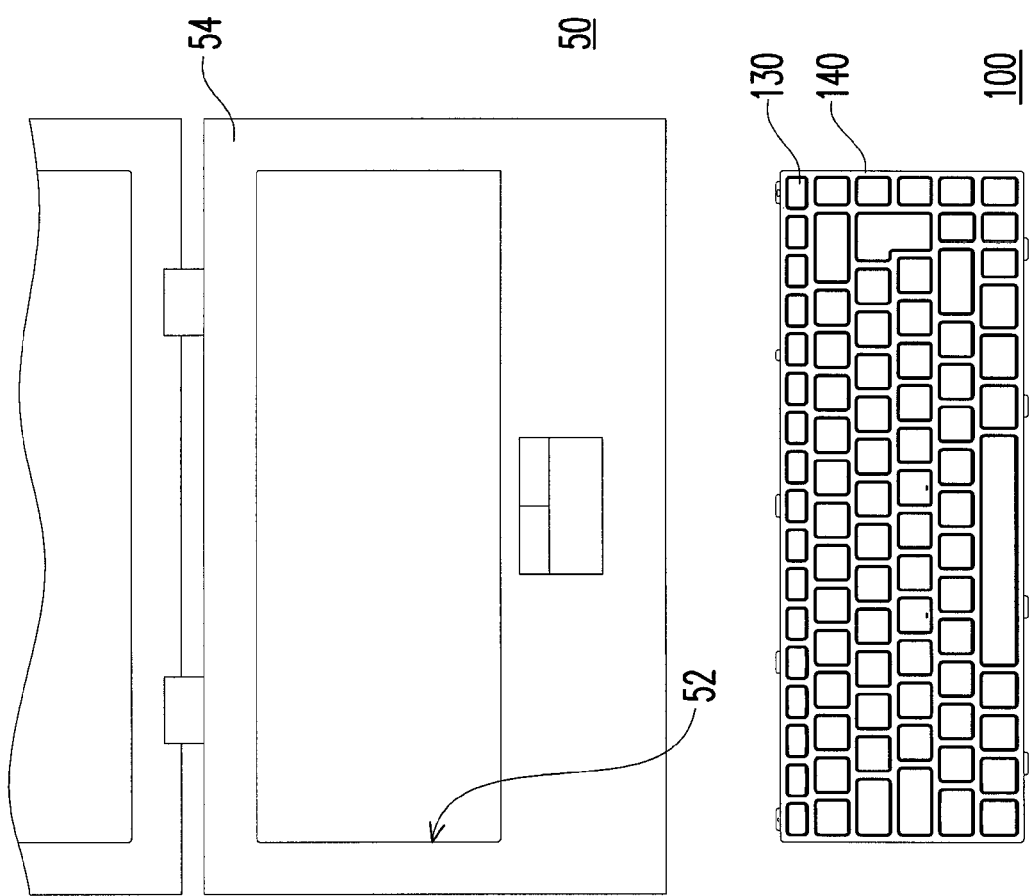
FIG. 1 is a top view of a keyboard module and a notebook computer according to an embodiment of the present invention.
Figure 2:
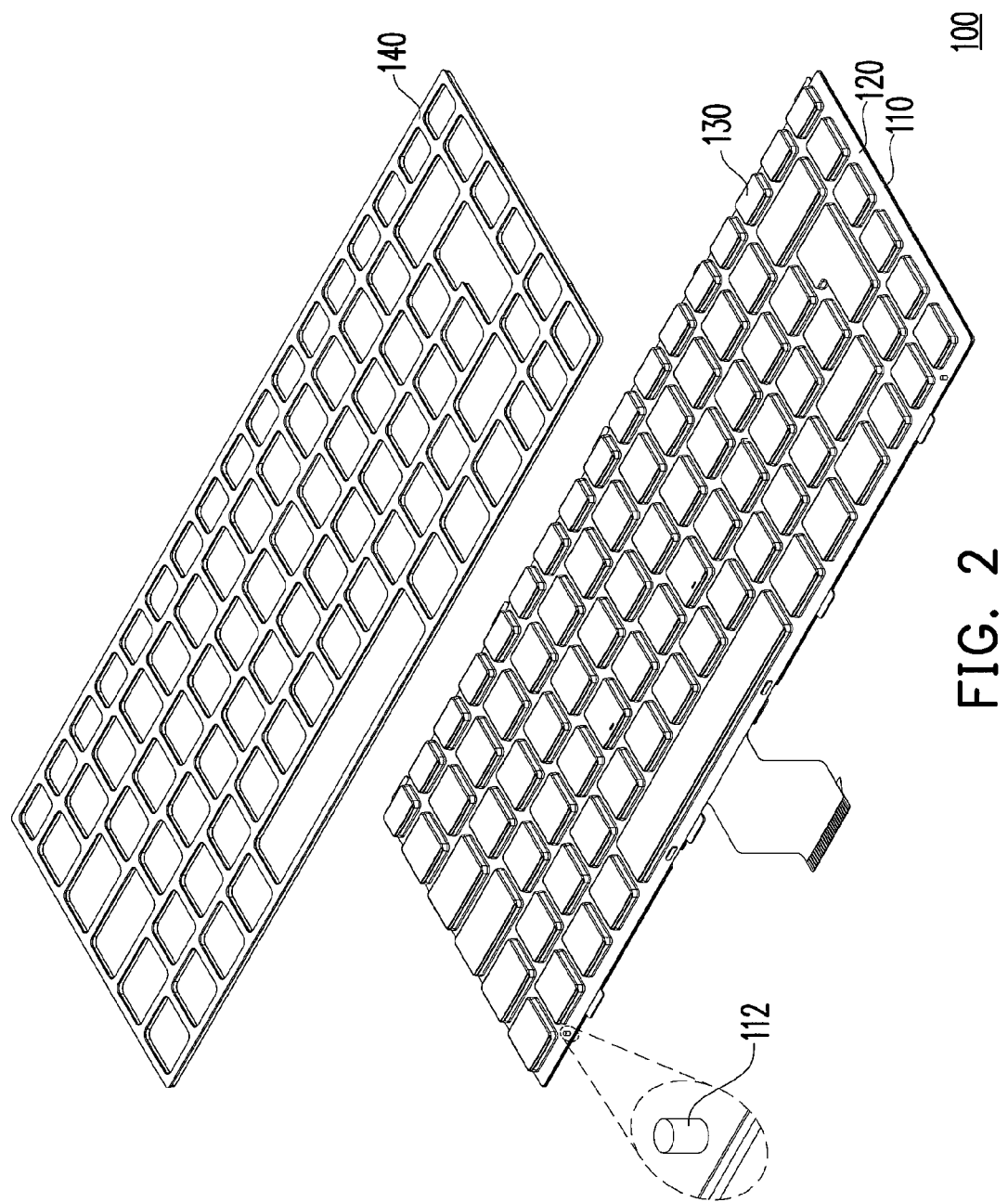
FIG. 2 is an exploded view of the keyboard module in FIG. 1.
Figure 3:
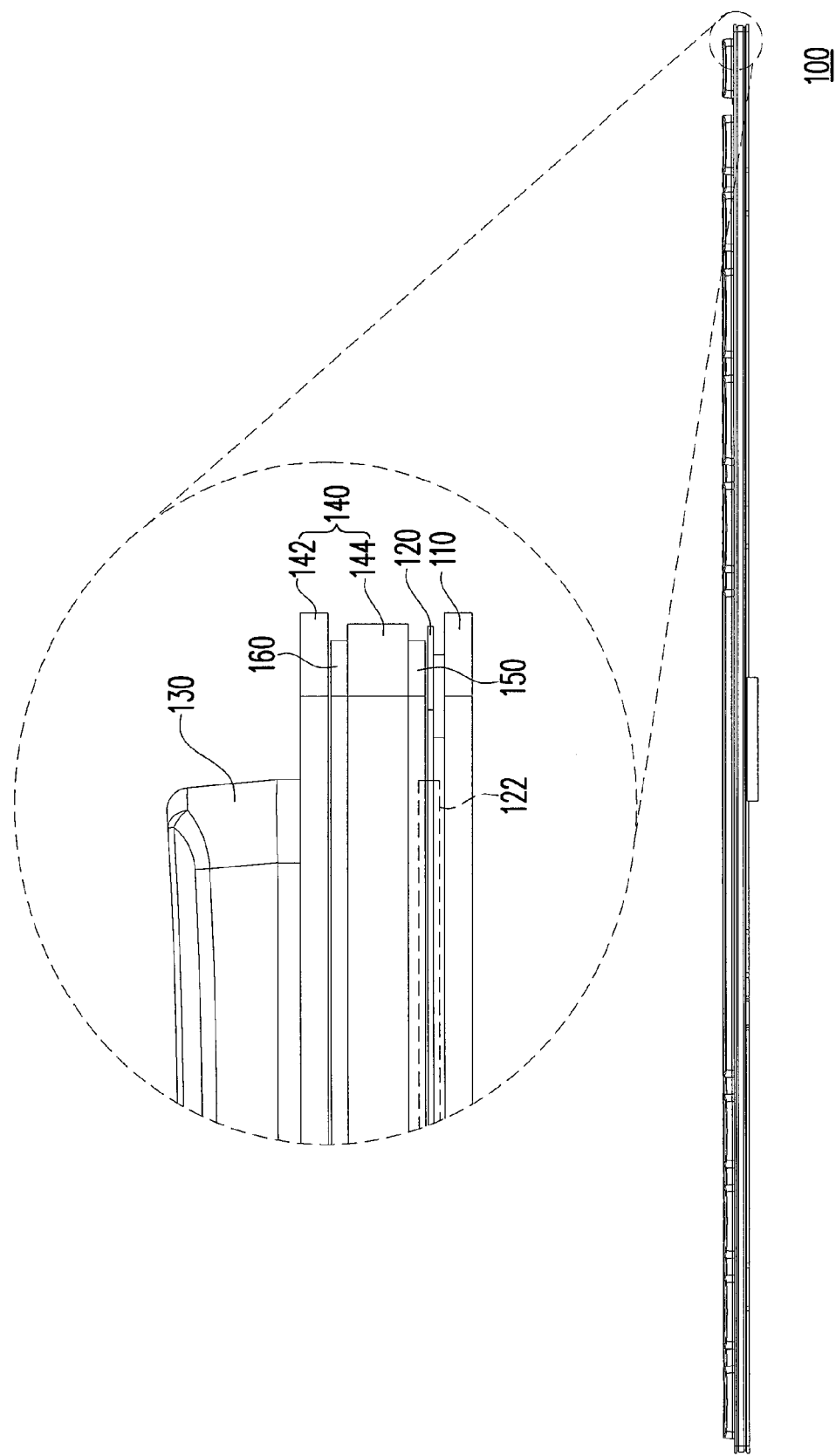
FIG. 3 is a side view of the keyboard module in FIG. 1.

FIG. 1 is a top view of a keyboard module and a notebook computer according to an embodiment of the present invention. FIG. 2 is an exploded view of the keyboard module in FIG. 1. FIG. 3 is a side view of the keyboard module in FIG. 1. Referring to FIG. 1, a keyboard module 100 in the present embodiment is suitable for being assembled to a recess 52 of a notebook computer 50. With reference to FIG. 2 and FIG. 3, the keyboard module 100 comprises a base plate 110, a membrane circuit 120, a plurality of keys 130, and a frame set 140.

Referring to FIG. 3, the membrane circuit 120 is disposed above the base plate 110, wherein the membrane circuit 120 has a plurality of touch portions 122. The keys 130 are assembled to the base plate 110 and positioned above the membrane circuit 120 to respectively correspond to the touch portions 122. Through the contact of the keys 130 and the touch portions 122, a user may transmit instructions to the notebook computer 50 via the membrane circuit 120.

Figure 4:
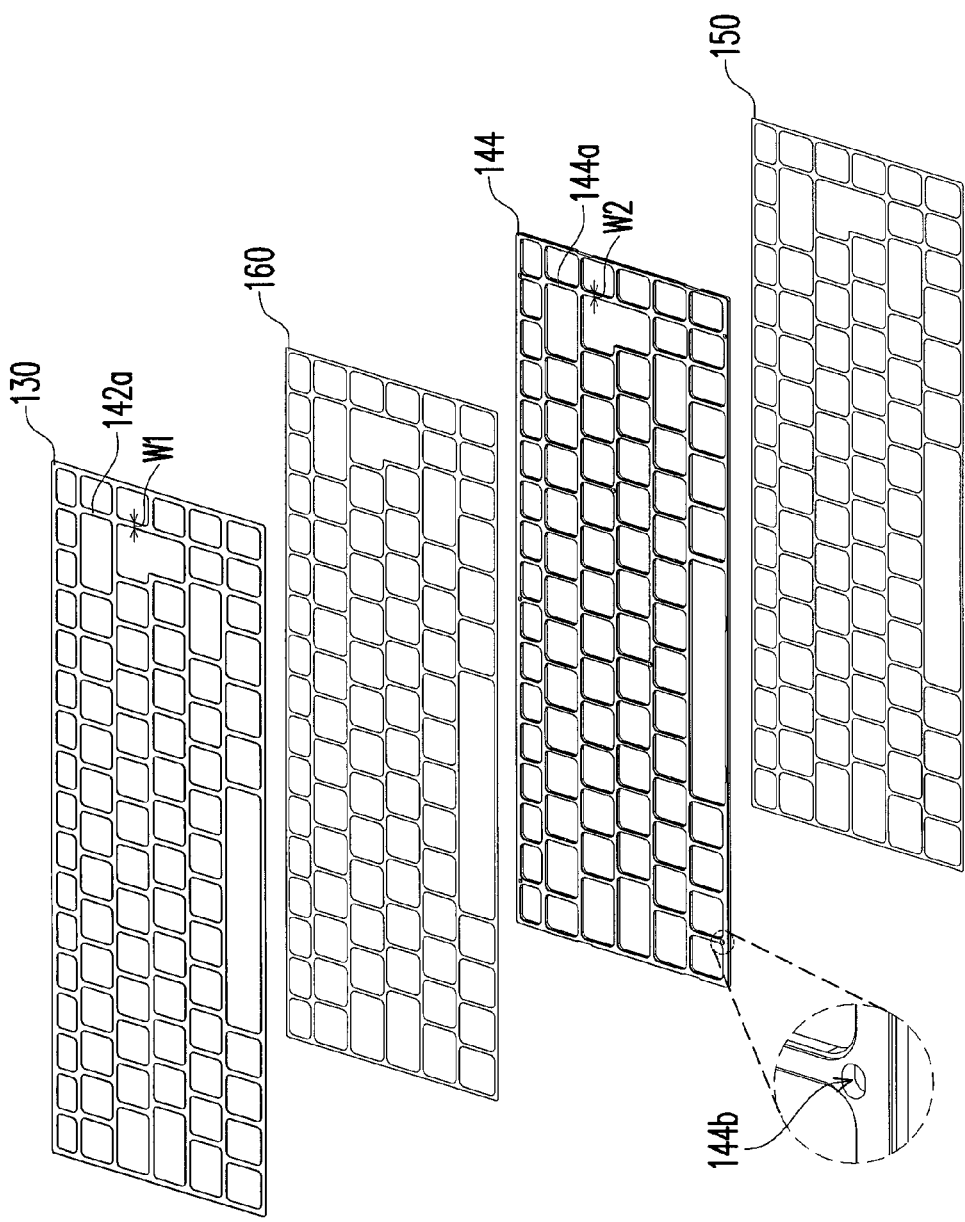
FIG. 4 is an exploded view of the frame set in FIG. 1.

FIG. 4 is an exploded view of the frame set in FIG. 1. With reference to FIG. 3 and FIG. 4, the frame set 140 is assembled to the base plate 110 and covers the membrane circuit 120. The frame set 140 comprises a first frame 142 and a second frame 144. The first frame 142 has a plurality of first ribs 142a. The second frame 144 is connected to the first frame 142 and located between the first frame 142 and the base plate 110, and the second frame 144 has a plurality of second ribs 144a.

Figure 5:
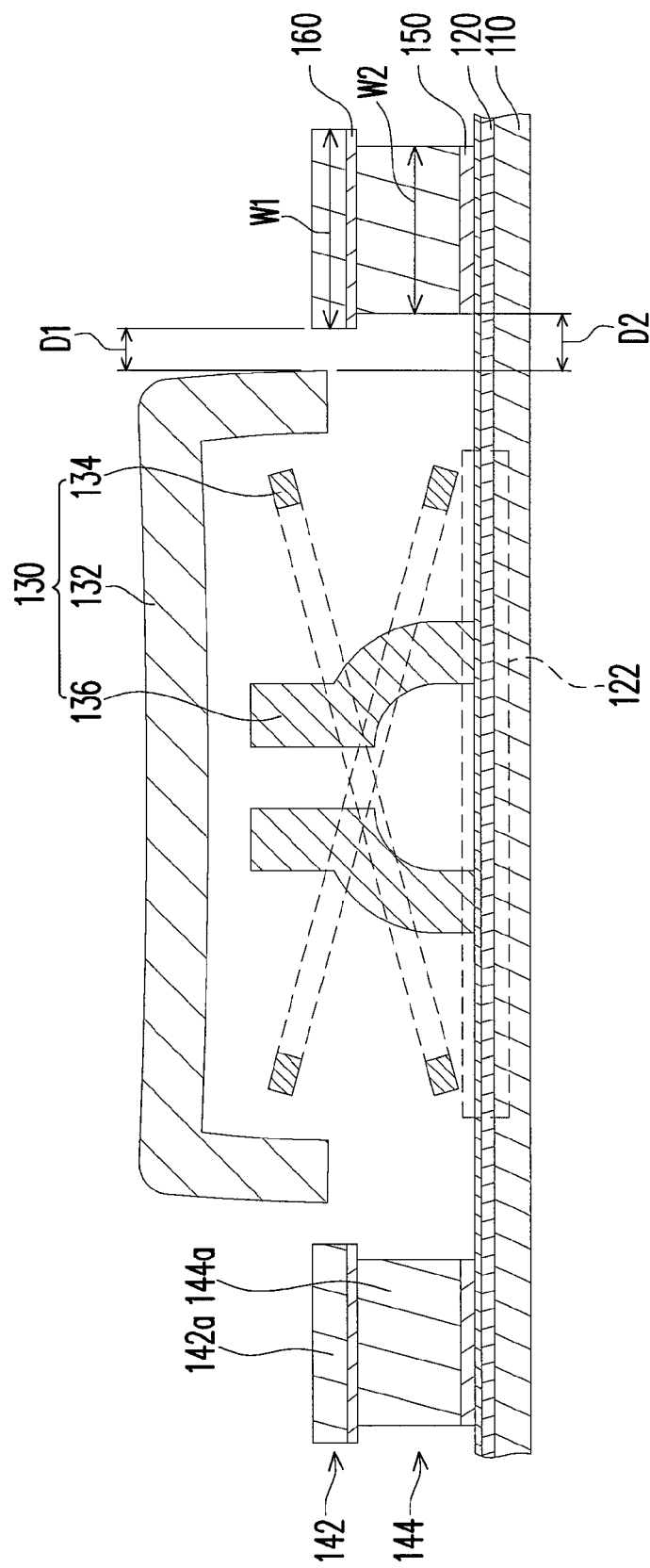
FIG. 5 is a cross-sectional view of a part of the frame set and keys in FIG. 1.

FIG. 5 is a cross-sectional view of a part of the frame set and keys in FIG. 1. Referring to FIG. 5, a width W2 of a portion of the second ribs 144a is smaller than a width W1 of the corresponding first ribs 142a. Each of the keys 130 passes through the second frame 144 and the first frame 142 in sequence to protrude above the frame set 140. In other words, the width W2 of the second ribs 144a of the second frame 144 is smaller than the width W1 of the corresponding first ribs 142a of the first frame 142, such that a gap D2 between the keys 130 and the second ribs 144a is larger than the gap D1 between the keys 130 and the first ribs 142a. Consequently, noise caused by stroke of the keys 130 and the second frame 144 is reduced.

With reference to FIG. 5, a gap D1 is located between the keys 130 and the first frame 142 to prevent key jam of the keys 130 and the first frame 142 during keystroke. Further, referring to FIG. 3 and FIG. 4, in the present embodiment, the frame set 140 may be connected to the base plate 110 through a first adhesive layer 150, and the first frame 142 may be connected to the second frame 144 through a second adhesive layer 160.

With reference to FIG. 2 and FIG. 4, in the present embodiment, the frame set 140 may be further connected to the base plate 110 by a plurality of positioning holes 144b on the second frame 144 and a plurality of positioning poles 112 on the base plate 110. Moreover, a material of the first frame 142 and the second frame 144 is, for example, plastic, metal, or glass. Additionally, a material of the first frame 142 may be transparent to meet the user's requirements. Particularly, the frame set 140 and a case 54 (as shown in FIG. 1) of the notebook computer 50 are physically separated. Therefore, the first frame 142 and the second frame 144 may be formed by a material different from the case 54.

Referring to FIG. 5, each of the keys 130 comprises a key cap 132, a connection element 134, and an elastic element 136. The connection element 134 and the elastic element 136 are connected between the base plate 110 and the key cap 132. In the present embodiment, the connection element 134 is a scissors-type linking mechanism. Through the linking mechanism of the connection element 134, the user may vertically press down the key cap 132 to contact the touch portions 122 of the membrane circuit 120. Then, the elasticity of the elastic element 136 would push the key cap 132 and the connection element 134 back to the original positions.

Figure 6:
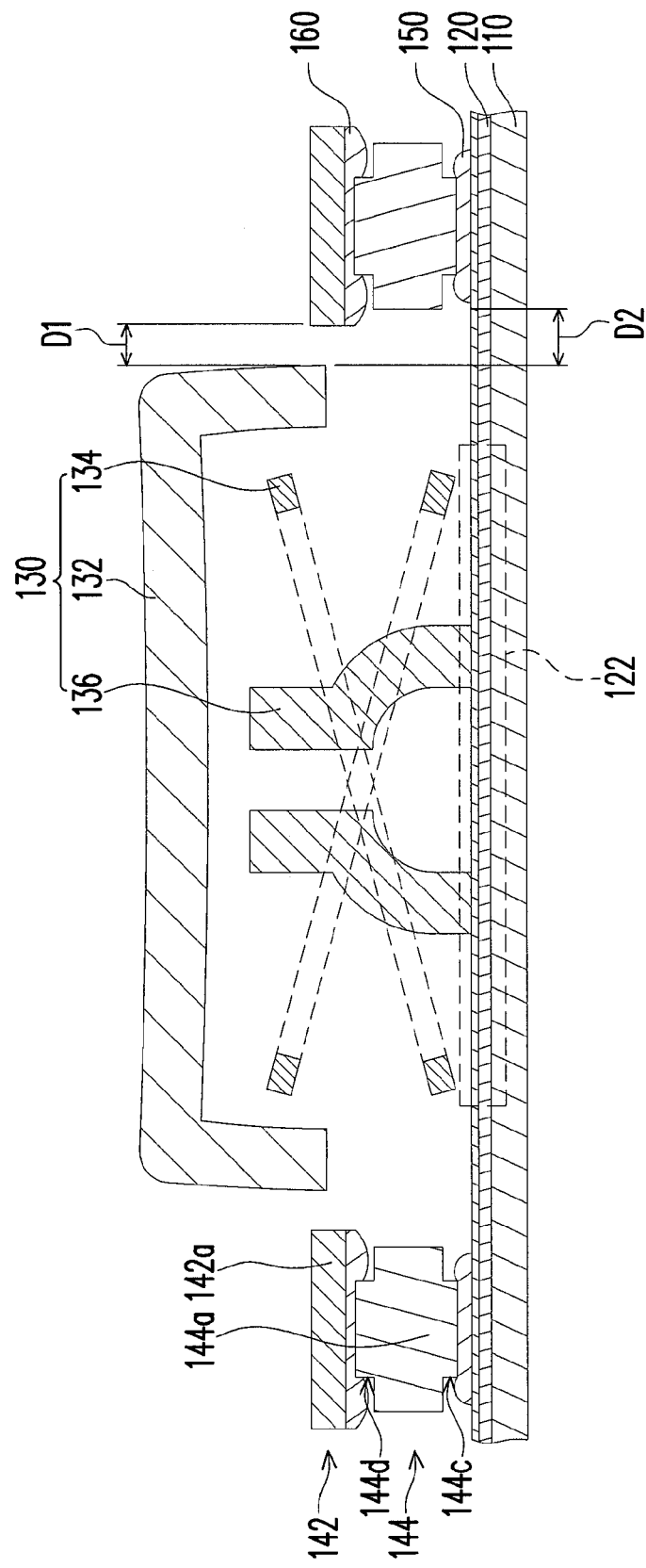
FIG. 6 is a cross-sectional view of a part of a frame set and keys in another embodiment of the present invention.

FIG. 6 is a cross-sectional view of a part of a frame set and keys in another embodiment of the present invention. With reference to FIG. 6, in the present embodiment, the second frame 144 further comprises a first trench 144c and a second trench 144d. When the first frame 142, the second frame 144, and the base plate 110 are assembled by adhesion, a portion of the first adhesive layer 150 and a portion of the second adhesive layer 160 may overflow due to the compression. The first trench 144c and the second trench 144d may respectively contain the overflow of the first adhesive layer 150 and the second adhesive layer 160, so as to maintain the neatness of the notebook computer.

In conclusion, the keyboard module of the present invention has the frame set that is separated from the case of the notebook computer for facilitating disassembly and can be fabricated individually. The feature of easy disassembly increases the convenience of cleaning the keyboard module. For the same reason, when the design of the frame set is changed, it is not required to manufacture new molds for the case of the notebook computer, which reduces the production costs. In addition, the material of the frame set does not need to be the same as that of the case of the notebook computer. Hence, various kinds of materials may be selected to form the frame set. The gaps between the second frame and keys of the frame set are enlarged, so as to reduce the occurrence of noise caused by stroke of the keys and the frame set. In addition, a gap is located between the first frame and keys of the frame set to prevent key jam of the keys and the first frame.

Although the present invention has been disclosed by the above embodiments, they are not intended to limit the present invention. Any person having ordinary knowledge in the art may make some modifications and alterations without departing from the spirit and scope of the present invention. Therefore, the scope for which protection is sought by the present invention falls in the appended claims.

What is claimed is:

1. A keyboard module for a notebook computer, the keyboard module comprising:
   a base plate;
   a membrane circuit disposed above the base plate, wherein the membrane circuit comprises a plurality of touch portions;
   a plurality of keys assembled to the base plate and positioned above the membrane circuit to correspond to the touch portions respectively; and
   a frame set assembled to the base plate and covering the membrane circuit, the frame set comprising:
      a first frame having a plurality of first ribs disposed in a staggered way; and
      a second frame connected to the first frame and positioned between the first frame and the base plate, and the second frame having a plurality of second ribs disposed in a staggered way, wherein a width of a portion of the second ribs is smaller than a width of the corresponding first ribs, and each of the keys passes through the second frame and the first frame in sequence to protrude above the frame set.

2. The keyboard module as claimed in claim 1, wherein a gap is located between each of the keys and the first frame.

3. The keyboard module as claimed in claim 1, wherein the frame set is connected to the base plate by a plurality of positioning holes and a plurality of positioning poles.

4. The keyboard module as claimed in claim 1, wherein the frame set is connected to the base plate through a first adhesive layer.

5. The keyboard module as claimed in claim 4, wherein the second frame further comprises a first trench and a portion of the first adhesive layer is disposed in the first trench.

6. The keyboard module as claimed in claim 1, wherein the first frame is connected to the second frame through a second adhesive layer.

7. The keyboard module as claimed in claim 6, wherein the second frame further comprises a second trench and a portion of the second adhesive layer is disposed in the second trench.

8. The keyboard module as claimed in claim 1, wherein a material of the first frame or the second frame is plastic, metal, or glass.

9. The keyboard module as claimed in claim 1, wherein a material of the first frame is transparent.

10. The keyboard module as claimed in claim 1, wherein each of the keys comprises:
   a key cap; and
   a connection element connected between the base plate and the key cap.

* * * * *